United States Patent

[11] 3,620,582

| [72] | Inventors | Hiroshi Sato;<br>Hisashi Toshima, both of Hitachi, Japan |
|---|---|---|
| [21] | Appl. No. | 54,810 |
| [22] | Filed | July 14, 1970 |
| [45] | Patented | Nov. 16, 1971 |
| [73] | Assignee | Hitachi, Ltd.<br>Tokyo, Japan |
| [32] | Priority | July 14, 1969 |
| [33] | | Japan |
| [31] | | 44/55111 |

[54] THRUST BEARING ASSEMBLY
12 Claims, 9 Drawing Figs.

[52] U.S. Cl. .................................................... 308/160
[51] Int. Cl. ................................................. F16c 17/06
[50] Field of Search ......................................... 308/9, 160, 168, 73

[56] References Cited
UNITED STATES PATENTS
1,387,930 8/1921 Kingsbury et al. ............ 308/160

Primary Examiner—Martin P. Schwadron
Assistant Examiner—Frank Susko
Attorney—Craig, Antonelli and Hill ABSTRACT: A thrust-bearing assembly having a plurality of adjacent bearing shoe segments supported such that when a load is added concentrically on one bearing shoe segment, the load is automatically divided among and received on adjacent bearing shoe segments positioned on both sides of said one bearing shoe segment through seesaw action of spring plates supporting the bearing shoe segments, whereby oil cut and overheat due to the concentric load can effectively be prevented.

PATENTED NOV 16 1971

INVENTORS
HIROSHI SATO AND HISASHI TOSHIMA
BY
Craig, Antonelli, Stewart & Hill
ATTORNEYS

THRUST BEARING ASSEMBLY

This invention relates to a thrust-bearing assembly for use in a vertical rotary machine, especially a large machine, such as a large water turbine generator.

Recently, a sudden increase in demand for electric power has required that rotary machines, such as water turbine generators, provide enlarged capacity and structure so as to improve the overall efficiency thereof. Such requirements cause bearing shoes in the thrust bearing assembly to receive a large load. It is therefore common that the bearing shoes are further divided into a plurality of smaller bearing shoe segments to reduce the force of the load per unit bearing shoe segment. As shown in FIG. 3, the bearing shoe segment is made as a sector which is elongated in the radial direction of the rotor shaft (not illustrated). It has been considered that if the elongated bearing shoe segment 1 is supported by a single point, said bearing shoe segment will be easily deformed during the operation of the electric machine and the load capacity of the bearing shoe segment 1 may be greatly reduced. For preventing such a disadvantage, the supporting structure based upon two-point support in the radial direction of the rotor shaft, that is, the longitudinal direction of the bearing shoe segment, has been utilized to prevent such reduction in the load capacity. As shown in FIGS. 3 through 6, the structure of the bearing shoe segment based upon two-point support uses a pair of shoe supporting spring plates 2a and 2b each having leg projections 4a and 4b on one main surface at opposite ends thereof and a central projection 3 on the other main surface at a central position thereof.

FIGS. 3 and 4 show that each of the spring plates 2a and 2b is arranged in such a manner that the longitudinal line through the pair of leg projections and the central projection is substantially parallel to the longitudinal direction of the bearing shoe segment 1. FIGS. 5 and 6 show that each of the spring plates 2a and 2b is arranged in such a manner that the longitudinal line through the pair of leg projections and the central projection is transverse to the radial direction of the rotor shaft passing through the center of the bearing shoe segment 1. In such a manner, all of the bearing shoe segments may be arranged on the base F to be supported through the spring plates 2a and 2b, wherein each of the bearing shoe segments 1 is supported independently of the others and has no relation to the adjacent bearing shoe segments 1.

It is important in such a construction that all of the spring plates 2a and 2b used in the thrust bearing assembly be shaped to have identical mechanical properties, such as dimensions and elasticity. If these spring plates do not have the same elasticity, the load adds concentrically on one of the bearing shoe segments and the uniform distribution of the load to the bearing shoe segments 1 cannot be accomplished. Therefore, materials for the spring plates 2a and 2b must be chosen to be uniform.

As mentioned above, there is a tendency to further divide the bearing shoe segment 1 into more and smaller segments to reduce the charge of the load for one segment so that the number of said spring plates 2a and 2b becomes enormous. As a result, it is practically impossible to make all of them identical and much labor and time are wasted to manufacture said spring plates; for in working the spring plates 2a and 2b, even a small irregularity in size cannot be avoided. Very high precision in manufacture is required to make the spring plates 2a and 2b identical and to bring irregularities in dimensions within allowable error ranges.

On the other hand, in the operation of a water turbine generator, variations in the water pressure produce variation of the thrusting force and cause an elastic deformation in the structure of the base F which supports the spring plates 2a and 2b. As a result, some bearing shoe segments receive more load than the others and a uniform load distribution among the bearing shoe segments cannot be obtained. This problem will be explained in more detail in the following.

As shown in FIG. 7, the base F on which the bearing shoe segments 1 are supported through the spring plates 2a and 2b is supported by arms A projecting radially toward the rotor shaft S from the plant pit. Since the rotor shaft is assembled on the above base in the condition of no load, the supporting arms A and the base F are kept horizontal in so-called standard planes. However, when the water turbine generator is driven, the supporting arm A and the base F are deformed by the load of the water pressure or the thrusting force into a dishlike shape with their central portion being forced down, as shown by the dot-dash-line in FIG. 7.

Accordingly, the bearing shoe segments arranged on the base F also tend to incline towards the rotor shaft. Since the surface of the thrust runner R which is constructed at right angles against the rotor shaft S cannot deform, the bearing shoe segments are forced to maintain the horizontal support along the surface of the thrust runner R. As a result, the difference in distance between the bearing shoe segment 1 and base F due to the inclination of the bearing shoe segment 1 should be absorbed by the spring plates 2a and 2b. Especially, the deformation of the supporting arm is absorbed by a large bending deformation of the spring plate 2a arranged at the outside portion of the bearing shoe segment 1. Therefore, the counteracting force of the spring plate 2a is far larger than that of the spring plate 2b. As the oil film pressure of the bearing shoe segment 1 concentrates on only a limited part of the spring plate 2a, as shown by a dot-dash-line in FIG. 8, the distribution of the oil film is unbalanced and the thickness of said oil film at the limited part decreases and the load capacity for each bearing shoe segment reduces. The curve of the other dot-dash-line illustrated in FIG. 8 shows the uniform distribution of the oil film pressure where the counteracting forces of the spring plates 2a and 2b are equal.

For the above-mentioned reasons, adjustments in the various sizes of the base F and the supporting arms A and particular construction thereof are required to avoid defects due to deformation in the base F during operation of the water turbine generator. As a method to prevent decrease in capacity for the load on a bearing shoe segment, resulting from the inclination thereof, it has been attempted to make the elasticity or flexibility of the spring plate 2a and 2b high so as to bring their counteracting forces within a predetermined range. Namely, the flexability is increased by making the distance between the leg projections 4a on the main surface at opposite ends of the spring plates 2a and 2b as long as possible. If the elasticity of the spring plates 2a and 2b is made large, these spring plates may absorb easily the shift of the base from the standard plane due to deformation of the base F or the supporting arms A, so that the reduction in the capacity for load may be prevented. However, as two spring plates 2a and 2 b are usually employed for one of the bearing shoe segments and space for arrangement thereof is limited in relation to the other parts of the thrust assembly, the distance between the leg projections 4a and 4b cannot be so lengthened in practical manufacture of a thrust-bearing assembly.

Now, another attempt has been made to support each bearing shoe segment by a single spring plate 2 having leg projections 3a and 3b in contact with the bearing shoe segment and a central projection 4 for contact with the base, as shown in FIG. 9. According to such construction, we can lengthen the distance between the leg projections 3a and 3b as compared with the spring plates shown in FIGS. 3 to 6.

Furthermore, since the single central projection 4 of the spring plate 2 supports the bearing shoe segment on the base F by one point, it can always keep the shoe segment horizontal without any difficulty, even if the base F and the supporting arms A incline as shown by the dot-dash-line F' in FIG. 9. However, since the distance between the leg projections 3a and 3b is predetermined by the longitudinal length of the bearing shoe segment and it is relatively short, it is difficult to manufacture the spring plate 2 to be elastic or flexible as desired from the practical point of view.

In addition, the foregoing spring plate provides no means for adjusting the unbalance of the load between itself and the other bearing shoe segments, and it cannot be expected to balance the thrusting load on each of the bearing shoe segments.

SUMMARY OF THE INVENTION

One of the objects according to this invention is to support a plurality of bearing shoe segments in a balanced manner by a particular arrangement of the spring plates having two leg projections on one main surface at opposite ends thereof and a central projection on the other main surface at a central projection thereof.

A further object of this invention is to reduce the parts of the thrust bearing assembly and to make the thrust-bearing assembly more easy to manufacture.

According to one form of the invention, a thrust-bearing assembly for use in a vertical rotary machine, comprising an annular thrust runner R mounted on a rotor shaft S of the machine, a plurality of separate bearing shoe segments $1a$, $1b$, $1c$, $1d$ ... adapted to cooperate with and slidingly support said thrust runner, and a plurality of shoe supporting members for supporting said bearing shoe segments against a base F finally supported by the supporting arms of the machine, characterized in that said shoe-supporting members are spring plates 2 having leg projections $3a$ and $3b$ on one main surface at opposite ends thereof and a central projection 4 on the other main surface at a central portion thereof, each bearing shoe segment being supported by the spring plates in such a manner that each bearing segment has a pair of supporting points along the longitudinal direction thereof, and one leg projection of each spring plate forms one of the supporting points of one bearing segment and the other projection forms one of the supporting points of the other bearing segment wherein the distance between the leg projections is greater than that between the pair of the supporting points.

The invention will be more fully described and will become apparent to those skilled in the art from the following detailed description when considered with the accompanying drawings.

HBRIEF DESCRIPTION OF THE DRAWINGS

DETAILED DESCRIPTION OF PREFERRED EMBODIMENT

Figure 1:
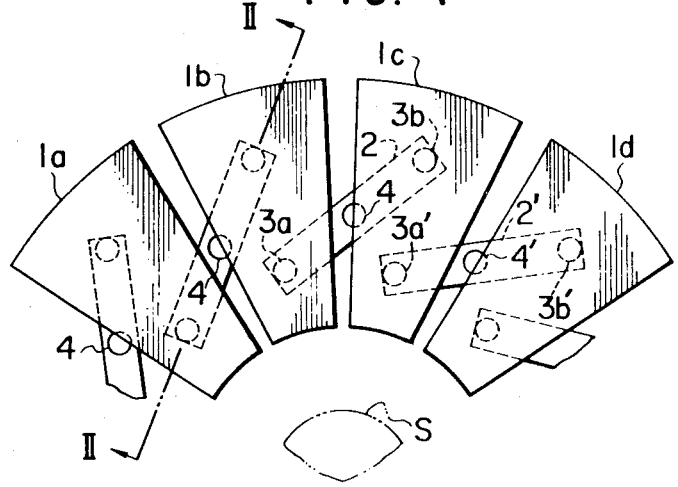
FIG. 1 shows a plane view of a portion of a thrust-bearing assembly according to this invention.
Figure 2:
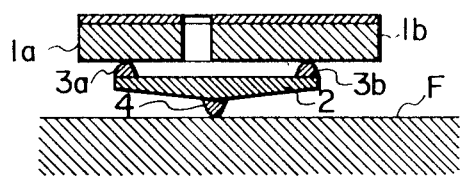
FIG. 2 shows a cross-sectional view taken along line II—II of FIG. 1.
Figure 3:
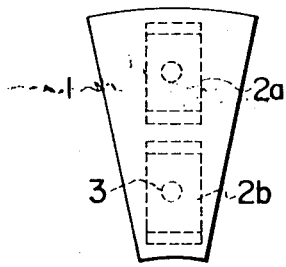
FIGS. 3 and 5 show plane views of a thrust-bearing shoe segment conventionally supported by a spring plate.
Figure 4:
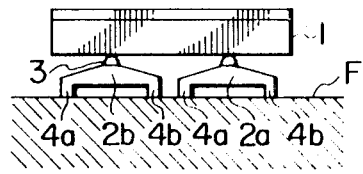
FIGS. 4 and 6 show side views of FIGS. 3 and 5, respectively.
Figure 5:
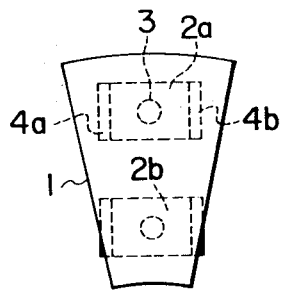
Figure 6:
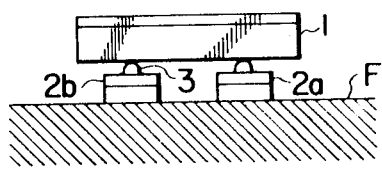

According to FIGS. 1 and 2 showing one embodiment of this invention, bearing shoe segments $1a$, $1b$, $1c$, $1d$ ... are arranged concentrically on the same circle around a rotor shaft S. Each bearing surface of the bearing shoe segments is shaped as a sector longitudinally disposed in the radial direction of the rotor shaft. The spring plates 2 each support said bearing shoe segments and have two leg projections $3a$ and $3b$ on one main surface at opposite ends thereof forming a pair of supporting points, and a central projection 4 on the other main surface at a central portion thereof forming a supporting leg. The point of the central projection is shaped as a convex surface.

Figure 7:
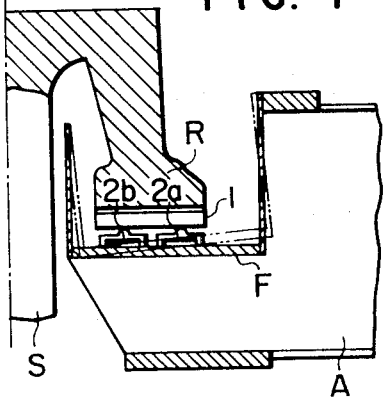
FIG. 7 shows a vertical cross-sectional view of a portion of the thrust-bearing assembly.
Figure 8:
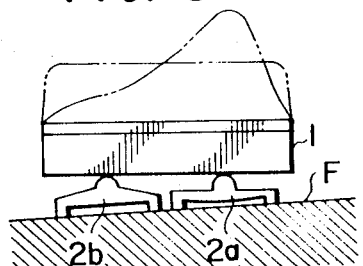
FIG. 8 shows a side view of a bearing shoe segment for explanation of load distribution according to prior known device.
Figure 9:
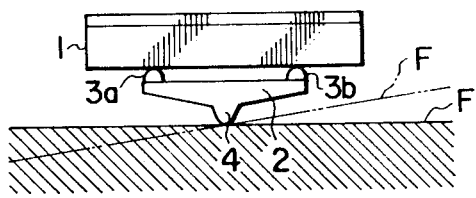
FIG. 9 shows a side view of another conventional thrust-bearing shoe segment.

Referring to FIG. 7, F shows a base fixed on the foundation (not shown) by supporting arms A and the base F is a supporting means for all of the bearing assembly including segments $1a$, $1b$, $1c$, $1d$ ... and the spring plates 2. Next, the relation between each of the bearing shoe segments $1a$, $1b$, $1c$, $1d$ ... and the spring plates 2 will be explained. The distance between the supporting points of the bearing shoe segments is predetermined according to the capacity of the load. Two supporting points are provided at each of the bearing shoe segments $1a$, $1b$, $1c$, $1d$ ... respectively, and they are located on the axis of symmetry extending in the radial direction of the rotor shaft.

The supporting point located at the inner portion of the bearing shoe segment $1b$ is supported in a pivotal manner by the leg projection $3a$ provided at the one end of the spring plate 2 and the leg projection $3b$ provided at the other end of the spring plate 2 supports the bearing shoe segment $1c$ in a pivotal manner at the supporting point located at the outer portion of the bearing shoe segment $1c$ adjacent to the bearing shoe segment $1b$. Furthermore, the supporting point located at the outer portion of the bearing shoe segment $1d$ is supported in a pivotal manner by the leg projection $3b'$ provided at the end of the other spring plate $2'$ and the leg projection $3a'$ provided at the other end of the spring plate $2'$ supports the supporting point located at the inner portion of the bearing shoe segment $1c$ adjacent to the bearing shoe segment $1d$ in a pivotal manner. The manner of support of only the bearing shoe segment $1c$ is specifically explained, but to provide all of the other bearing shoe segments by the same arrangement obviously follows in the same manner.

According to the above construction, when one bearing shoe segment $1c$ is positioned above the standard surface level of all the bearing shoe segments and receives a concentric load, the force which presses down on the bearing shoe segment $1c$ lifts up adjacent bearing shoe segments $1b$ and $1d$ through seesaw action of the spring plates 2 and $2'$. Namely, when the bearing shoe segment $1c$ is forcedly pressed down in comparison with the adjacent bearing shoe segments $1b$ and $1d$, the downward force is transmitted dividedly to the leg projections $3a'$ and $3b$ of the two spring plates 2, $2'$ respectively, and further this divided force is transmitted to the opposite leg projections $3a$ and $3b'$, located under the adjacent bearing shoe segments $1b$ and $1d$, through the spring plate 2, $2'$ wherein the central projections 4, $4'$ act as the fulcrum. Therefore, the bearing shoe segments $1b$ and $1d$ are both caused to lift up, so that bearing shoe segments $1b$ and $1d$ begin to take a part of the change of the load originally having concentrated on the bearing shoe segment $1c$. According to this invention, the load concentrating on a single bearing shoe segment $1c$ is distributed to the adjacent bearing shoe segments $1b$ and $1d$. Moreover, the distance between the leg projections $3a$ and $3b$ of the spring plates 2 is so constructed as to be lengthened regardless of locations of supporting points in one segment. Thus, load concentration can be avoided and sufficient elastic deformation can be obtained to absorb dimensional errors in manufacturing. Therefore, undesirable deformation and excessive damage due to abrasion and overheat resulting from thinning of the oil film caused by concentration of the load is effectively avoided.

On the contrary, when one bearing shoe $1c$ is positioned under the standard surface level of all the bearing shoe segments due to deformation of the base F, the reactive force of the load which is received by the adjacent bearing shoe segments $1b$ and $1d$ acts through the spring plates 2, $2'$ to lift up the bearing shoe segment $1c$ to the standard level so that all of the bearing shoe segments $1a$, $1b$, $1c$, $1d$ ... may receive an equal load. Accordingly, as compared with a conventional bearing assembly in which each of the bearing shoe segments $1a$, $1b$, $1c$, $1d$ ... are independently supported, this invention makes all of the bearing shoe segments $1a$, $1b$, $1c$, $1d$ ... take up the partial change of the load equally.

Furthermore, according to this invention, even in the case where the bearing shoe segment $1d$ is supported by the leg projection $3b$ of the spring plate 2 supporting the bearing shoe segment $1b$ by the leg projection $3a$, the same effect is obtained.

As a result, a balanced thrust-bearing assembly can be constructed having an increased load and excessive abrasion can be prevented. Furthermore, since the spring plate 2 is so arranged as to ride over two adjacent bearing shoe segments and to operatively connect the inner portion of one bearing shoe segment with the outer portion of the adjacent bearing shoe, the distance between the leg projections 3a and 3b can be lengthened in comparison with the conventional spring plates. Accordingly, the spring plate 2 can have sufficient elasticity to absorb any small errors in size of the spring plates 2 and the bearing shoe segments and any deformation of the supporting base F. Therefore, reduction in the capacity of the load can be prevented.

Furthermore, as the spring plate 2 is so arranged as to ride over the adjacent bearing shoe segments in the same manner of construction of two-point support, the number of the spring plates 2 is half that required with the prior art and the supporting structure of the bearing shoe segments can be simplified. This reduction in the number of the parts employed makes simple the construction of the bearing shoe segments and spring plates and also reduces time for construction; and, as a result, check and maintenance after construction also is simplified.

The small number of spring plates 2 and large elasticity thereof make the requirement for highly precise manufacturing techniques unnecessary and enable simplified manufacture in a short time. As the spring plates 2 support the bearing shoe segments in such a manner as to be pivotable on the base F, even if the base F is inclined, the spring plates 2 can always horizontally support each of the bearing shoe segments regardless of this inclination and can always retain the bearing shoe segments in close contact with the bearing runner (not illustrated).

We claim:

1. A thrust-bearing assembly comprising a plurality of adjacent bearing shoe segments each having a pair of supporting points along the longitudinal direction thereof, a supporting base on which said segments are to be supported, and a plurality of spring plates supporting said segments on said base, each spring plate being positioned with one end thereof supporting one segment and the other end thereof supporting an adjacent segment at the supporting points thereof.

2. A thrust-bearing assembly as defined in claim 1, wherein the length of each spring plate is greater than the distance between the supporting points on a segment.

3. A thrust-bearing assembly as defined in claim 1, wherein the pair of supporting points of each segment include an inner and an outer supporting point, each spring plate extending from an inner supporting point on one segment to an outer supporting point of an adjacent segment.

4. A thrust-bearing assembly as defined in claim 1, wherein said segments are circularly arranged and said pair of supporting points are radially disposed, each spring plate extending from an inner supporting point on one segment to an outer supporting point of an adjacent segment.

5. A thrust-bearing assembly as defined in claim 4, wherein each spring plate includes a pair of leg projections on one surface at respective ends and a central projection on the opposite surface for contact with said base.

6. A thrust-bearing assembly as defined in claim 5, wherein the central projections on said spring plates are all located on a common circle.

7. A thrust-bearing assembly as defined in claim 2, wherein all of said spring plates are of the same size.

8. A thrust-bearing assembly as defined in claim 1, wherein each spring plate includes a pair of leg projections on one surface at respective ends, said leg projections being in contact with a segment at a point on the line of symmetry thereof.

9. A thrust-bearing assembly for use in a vertical rotary machine, including an annular thrust runner mounted on a rotor shaft of the machine, a plurality of separate bearing shoe segments adapted to cooperate with and slidingly support said thrust runner, and a plurality of shoe-supporting members for supporting said bearing shoe segments against a base supported by respective supporting arms, said shoe-supporting members comprising spring plates having leg projections on one main surface at opposite ends thereof and a central projection on the other main surface at a central portion thereof, each bearing shoe segment being supported by the spring plates in such a manner that each bearing segment has a pair of supporting points along the longitudinal direction thereof, and one leg projection of each spring plate forms one of the supporting points of one bearing segment and the other projection forms one of the supporting points of the other bearing segment with the distance between the leg projections being greater than that between the pair of the supporting points of each segment.

10. A thrust-bearing assembly as defined in claim 9, wherein the pair of supporting points of each segment include an inner and an outer supporting point, each spring plate extending from an inner supporting point on one segment to an outer supporting point of an adjacent segment.

11. A thrust-bearing assembly as defined in claim 10, wherein the central projections on said spring plates are all located on a common circle.

12. A thrust-bearing assembly as defined in claim 9 wherein said segments are circularly arranged and said pair of supporting points are radially disposed, each spring plate extending from an inner supporting point on one segment to an outer supporting point of an adjacent segment.

* * * * *